United States Patent
Kaiduka et al.

(10) Patent No.: US 8,597,829 B2
(45) Date of Patent: Dec. 3, 2013

(54) NONAQUEOUS ELECTROLYTE SECONDARY BATTERY WITH ROLLED ELECTRODE ASSEMBLY

(75) Inventors: Atsushi Kaiduka, Tokushima (JP); Masanori Ogi, Tokushima (JP); Yukihiro Oki, Tokushima (JP); Masato Iwanaga, Tokushima (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 792 days.

(21) Appl. No.: 12/702,346

(22) Filed: Feb. 9, 2010

(65) Prior Publication Data

US 2010/0233525 A1   Sep. 16, 2010

(30) Foreign Application Priority Data

Mar. 10, 2009   (JP) .................................. 2009-056907

(51) Int. Cl.
*H01M 2/02* (2006.01)
*H01M 6/10* (2006.01)

(52) U.S. Cl.
USPC ........... 429/208; 429/163; 429/164; 429/233; 29/623.1; 29/623.4

(58) Field of Classification Search
None
See application file for complete search history.

(56) References Cited

U.S. PATENT DOCUMENTS

| 4,929,519 | A | * | 5/1990 | Catotti | 429/94 |
| 2005/0277018 | A1 | * | 12/2005 | Kim | 429/120 |
| 2007/0154787 | A1 | * | 7/2007 | Jang et al. | 429/94 |
| 2008/0213671 | A1 | * | 9/2008 | Kogetsu et al. | 429/246 |

FOREIGN PATENT DOCUMENTS

| JP | 7-320770 A | 12/1995 |
| JP | 9-293537 A | 11/1997 |
| JP | 2008-210573 A | 9/2008 |

* cited by examiner

*Primary Examiner* — Kwang Han
(74) *Attorney, Agent, or Firm* — Westerman, Hattori, Daniels & Adrian, LLP

(57) ABSTRACT

The nonaqueous electrolyte secondary battery includes a rolled electrode assembly 14E formed by rolling a positive electrode plate 11 and a negative electrode plate 12 with a separator 13 interposed therebetween, the separator 13 is fixed on the outermost periphery of the rolled electrode assembly 14E with an adhesive tape for fixing a roll end 30e, an exposed portion of a negative electrode substrate 12c without an active material mixture layer 12b is placed on an outermost periphery side of the negative electrode plate 12, a negative electrode tab 12a is connected to the negative electrode substrate 12c on an outermost periphery side, and the adhesive tape 30e is not overlapped with a roll end 11d of the positive electrode plate 11 and a roll end 12d of the negative electrode substrate 12c. Thus the battery is seldom broken even when charging and discharging are repeatedly provided at high voltage.

5 Claims, 6 Drawing Sheets

NONAQUEOUS ELECTROLYTE SECONDARY BATTERY WITH ROLLED ELECTRODE ASSEMBLY

TECHNICAL FIELD

The present invention relates to a nonaqueous electrolyte secondary battery including a cylindrical shaped battery outer can and rolled electrode assembly, and in particular, relates to a nonaqueous electrolyte secondary battery including a cylindrical shaped battery outer can and rolled electrode assembly in which a positive electrode plate or negative electrode plate is seldom broken even when charging and discharging are repeated at high voltage.

BACKGROUND ART

For various electronic devices or the like such as portable terminals represented by cell phones, various types of batteries are used as the power supply. In addition, exhaust controls of carbon dioxide gas and the like are being tightened in view of the recent moves to protect the environment. In the car industry, not only automobiles using fossil fuels such as gasoline, diesel oil and natural gas, but also electric vehicles (EVs) and hybrid electric vehicles (HEVs) have been developed actively. In addition, a recent sudden rise in the price of the fossil fuels has accelerated the development of EVs and HEVs.

As for secondary batteries used for such applications, nonaqueous electrolyte secondary batteries represented by a lithium ion battery and alkaline storage batteries represented by a nickel-cadmium storage battery, nickel-hydrogen storage battery, and the like are known. Among them, the nonaqueous electrolyte secondary batteries represented by the lithium ion battery have excellent characteristics, for example, high operating voltage (3 V or higher), high theoretical energy density as compared with aqueous solution based batteries, low self-discharge, wide range of operating temperature, and excellent liquid leakage resistance. Consequently, their application has been increasing.

Nonaqueous electrolyte secondary batteries, for example, a cylindrical-shaped battery, are assembled in the following steps: positive and negative electrode plates interposing a separator therebetween are rolled to manufacture a cylindrical-shaped rolled electrode assembly; the cylindrical-shaped rolled electrode assembly is inserted into a cylindrical-shaped battery outer body and a nonaqueous electrolyte is poured; and a mouth of the battery outer body is sealed with a sealing body having a positive or negative electrode terminal to be a sealed-state.

At that time, a roll end of the rolled electrode assembly is fixed with an adhesive tape for fixing a roll end so as not to loosen, and the rolled electrode assembly is inserted into the cylindrical-shaped battery outer can. For example, JP-A-07-320770 discloses an invention relating to batteries including a spirally electrode assembly in which, as Comparative Example 1, a separator of the spirally electrode assembly extends over a roll end of an electrode plate, and only a roll end of the separator is fixed with an insulating tape. Furthermore, JP-A-09-293537 discloses an invention relating to nonaqueous electrolyte secondary batteries in which a separator of a rolled electrode assembly extends over a roll end of an electrode plate, and only a roll end of the separator is fixed with an insulating tape.

In the above nonaqueous electrolyte secondary batteries including the rolled electrode assembly having the positive electrode plate, negative electrode plate, separator and adhesive tape for fixing a roll end, the roll ends of the positive electrode plate and negative electrode plate have steps, so that stress from the inside concentrates on the roll end side when the rolled electrode assembly expands. Furthermore, the outer side of the adhesive tape for fixing a roll end is pressured from the outer can when the rolled electrode assembly expands. Moreover, in charge and discharge cycles at high voltage of the nonaqueous electrolyte secondary battery, oxidation-reduction decomposition of the electrolyte is accelerated, so that the rolled electrode assembly further expands, and then the roll end side of the rolled electrode assembly is readily stressed.

Moreover, recently, as disclosed in JP-A-2008-210573, positive electrode plates capable of being charged at a high voltage of 4.4 V or higher vs. Li have been developed. In the positive electrode plates which are charged and discharged at such high voltage, the nonaqueous electrolyte is violently decomposed to generate a large amount of gas, and consequently, the rolled electrode assembly expands larger to further stress the roll end of the rolled electrode assembly.

In contrast, when an outermost periphery side of the rolled electrode assembly is made to be an exposed portion of the negative electrode substrate where the negative electrode active material mixture layer of the negative electrode is not formed, and then a negative electrode tab is attached to the outermost periphery side of the negative electrode substrate, the negative electrode plate, positive electrode plate, adhesive tape for fixing a roll end and the like necessarily form steps at the roll end of the rolled electrode assembly. Because of this, at worst, the positive electrode plate or negative electrode plate may be broken by the stress from the inside, the pressure from the outer can as well as the repeated expansion and contraction of the rolled electrode assembly accompanied with charging and discharging and the impact, vibration, or the like from the outside.

SUMMARY

An advantage of some aspects of the invention is to provide a nonaqueous electrolyte secondary battery in which, even when an outermost periphery side of a rolled electrode assembly is an exposed portion of a negative electrode substrate where a negative electrode active material mixture layer of a negative electrode is not formed, a roll end hardly gives a step, and a positive electrode plate or negative electrode plate is hardly broken.

According to an aspect of the present invention, a nonaqueous electrolyte secondary battery includes a cylindrical shaped battery outer can, and a rolled electrode assembly formed by rolling a positive electrode plate and a negative electrode plate with a separator interposed therebetween to insulate each other. The positive electrode plate includes a positive electrode substrate in which both sides of the positive electrode substrate are coated with a positive electrode active material mixture, the negative electrode plate includes a negative electrode substrate in which both sides of the negative electrode substrate are coated with a negative electrode active material mixture, and the rolled electrode assembly is put into the battery outer can. The separator is placed on an outermost periphery of the rolled electrode assembly, and the separator is fixed on the outermost periphery of the rolled electrode assembly with an adhesive tape for fixing a roll end. An exposed portion of the negative electrode substrate without the negative electrode active material mixture layer is placed on an outermost periphery side of the negative electrode plate, and a negative electrode tab is connected to the negative electrode substrate on the outermost periphery side. The adhesive tape for fixing a roll end is not overlapped with a roll end of the positive electrode plate and a roll end of the negative electrode substrate.

In the rolled electrode assembly in the nonaqueous electrolyte secondary battery of the present aspect of the invention, the separator is placed on the outermost periphery, the separator is fixed on the outermost periphery of the rolled electrode assembly with the adhesive tape for fixing a roll end, the exposed portion of the negative electrode substrate without the negative electrode active material mixture layer is placed on the outermost periphery side of the negative electrode plate, the negative electrode tab is connected to the negative electrode substrate on the outermost periphery side, and the adhesive tape for fixing a roll end on the outermost periphery is not overlapped with the roll end of the positive electrode plate and the roll end of the negative electrode substrate. When a rolled electrode assembly has such an arrangement, a step due to the adhesive tape for fixing a roll end, a step due to the roll end of the positive electrode plate, and the roll end of the negative electrode substrate are not overlapped with each other, and the steps are placed to be dispersed. Thus, according to the nonaqueous electrolyte secondary battery of the present aspect of the invention, a nonaqueous electrolyte secondary battery having the following features can be obtained: even when the rolled electrode assembly expands at the time of charging, the step parts are hardly pressured; and moreover, even when the rolled electrode assembly repeatedly expands and contracts accompanied with charging and discharging, and even when impact, vibration or the like from the outside is applied, the positive electrode plate or negative electrode plate is hardly broken.

In the nonaqueous electrolyte secondary battery of the present aspect of the invention, as the positive electrode active material, one of or a mixture of two or more compounds including $LiCoO_2$, $LiNiO_2$, $LiNi_yCo_{1-y}O_2$ (y=0.01 to 0.99), $LiMnO_2$, $LiMn_2O_4$, $LiNi_xCo_yMn_zO_2$ (x+y+z=1), $LiFePO_4$ or the like capable of reversibly absorbing and desorbing lithium ions may be used. Here, in these lithium transition-metal composite oxides, a part of the transition-metals may be partially substituted with heterogeneous elements such as Zr, Mg, Al and Ti.

Furthermore, in the nonaqueous electrolyte secondary battery of the present aspect of the invention, as the negative electrode active material, a carbonaceous material may be used. The carbon material as the negative electrode active material has excellent characteristics such as high safety, excellent initial efficiency, good potential flatness and high density because the dendrites do not grow. A suitable carbon material as the negative electrode active material is a graphite material such as artificial graphite and natural graphite widely used for the nonaqueous electrolyte secondary battery.

Furthermore, in the nonaqueous electrolyte secondary battery of the present aspect of the invention, as a nonaqueous solvent (organic solvent) composing the nonaqueous solvent electrolyte, carbonates, lactones, ethers, esters and the like may be used, and two or more kinds of the solvents may also be used as a mixture. Among them, carbonates are specifically preferred.

Specific examples include ethylene carbonate (EC), propylene carbonate (PC), butylene carbonate (BC), vinylene carbonate (VC), cyclopentanone, sulfolane, 3-methylsulfolane, 2,4-dimethylsulfolane, 3-methyl-1,3-oxazolidin-2-one, dimethyl carbonate (DMC), methyl ethyl carbonate (MEC), diethyl carbonate (DEC), methyl propyl carbonate, methyl butyl carbonate, ethyl propyl carbonate, ethyl butyl carbonate, dipropyl carbonate, γ-butyrolactone, γ-valerolactone, 1,2-dimethoxyethane, tetrahydrofuran, 2-methyltetrahydrofuran, 1,3-dioxolane, methyl acetate, ethyl acetate and 1,4-dioxane.

As a solute of the nonaqueous electrolyte in the present aspect of the invention, lithium salts commonly used as the solute in the nonaqueous electrolyte secondary battery may be used. Examples of these lithium salts include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Among them, $LiPF_6$ is specifically preferred. Dissolved amount of the solute with respect to the nonaqueous solvent is preferably 0.5 to 2.0 mol/L.

Furthermore, in the nonaqueous electrolyte secondary battery of the present aspect of the invention, it is preferable that the negative electrode substrate is made of copper foil, and that the thickness of the negative electrode substrate is 10 μm or less and 6 μm or more.

When the thickness of the negative electrode substrate becomes thicker, the step due to the roll end of the negative electrode substrate becomes larger. Furthermore, as the negative electrode substrate of the nonaqueous electrolyte secondary battery, copper foil is commonly used. In the nonaqueous electrolyte secondary battery of the present aspect of the invention, the negative electrode substrate is made of the copper foil, and the thickness of the negative electrode substrate is 10 μm or less and 6 μm or more. Therefore, the nonaqueous electrolyte secondary battery in which the positive electrode plate or negative electrode plate is hardly broken can be obtained. The negative electrode substrate having a thickness of more than 10 μm is not preferable, because the positive electrode plate or negative electrode plate is often broken. Furthermore, when the negative electrode substrate is made of copper, the lower limit of the thickness of the negative electrode substrate is preferably 6 μm or more in order to keep the strength required when the rolled electrode assembly is manufactured.

Furthermore, in the nonaqueous electrolyte secondary battery of the present aspect of the invention, it is preferable that the positive electrode plate has a final charge voltage of 4.4 V or higher vs. Li.

When the positive electrode plate having a final charge voltage of 4.4 V or higher vs. Li is used, oxidation-reduction decomposition of the electrolyte is accelerated at the time of charging and discharging, and consequently the rolled electrode assembly expands larger. Even when the invention is applied to such positive electrode plate having a final charge voltage of 4.4 V or higher vs. Li, the step due to the adhesive tape for fixing a roll end, the step due to the roll end of the positive electrode plate, and the roll end of the negative electrode substrate are not overlapped with each other, and the steps are placed to be dispersed. Thus, the nonaqueous electrolyte secondary battery in which the positive electrode plate or negative electrode plate is hardly broken can be obtained.

When the final charge voltage is higher, the capacity of the positive electrode can be used at a higher ratio with respect to the theoretical capacity in proportion to the final charge voltage, and as a result, the nonaqueous electrolyte secondary battery can have higher capacity and higher energy density. However, when the final charge voltage is too high, the structure of the positive electrode active material often deteriorates and the electrolyte component is largely decomposed on the positive electrode plate surface, so that a preferred upper limit is 4.6 V vs. Li. Examples of such positive electrode active material include a mixture of a lithium-cobalt composite oxide in which lithium cobalt oxide contains at least both zirconium and magnesium and a lithium-manganese-nickel composite oxide having a layered structure and containing at least both manganese and nickel.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the present invention will be described in detail with Examples and Comparative Examples by referring to drawings. However, Examples described below are illustrative examples of nonaqueous electrolyte secondary batteries for embodying the technical spirit of the invention, and are not intended to limit the invention to the nonaqueous electrolyte secondary battery described in the examples. That is, the invention may be equally applied to various nonaqueous electrolyte secondary batteries without departing from the technical spirit described in the appended claims.

Figure 1:
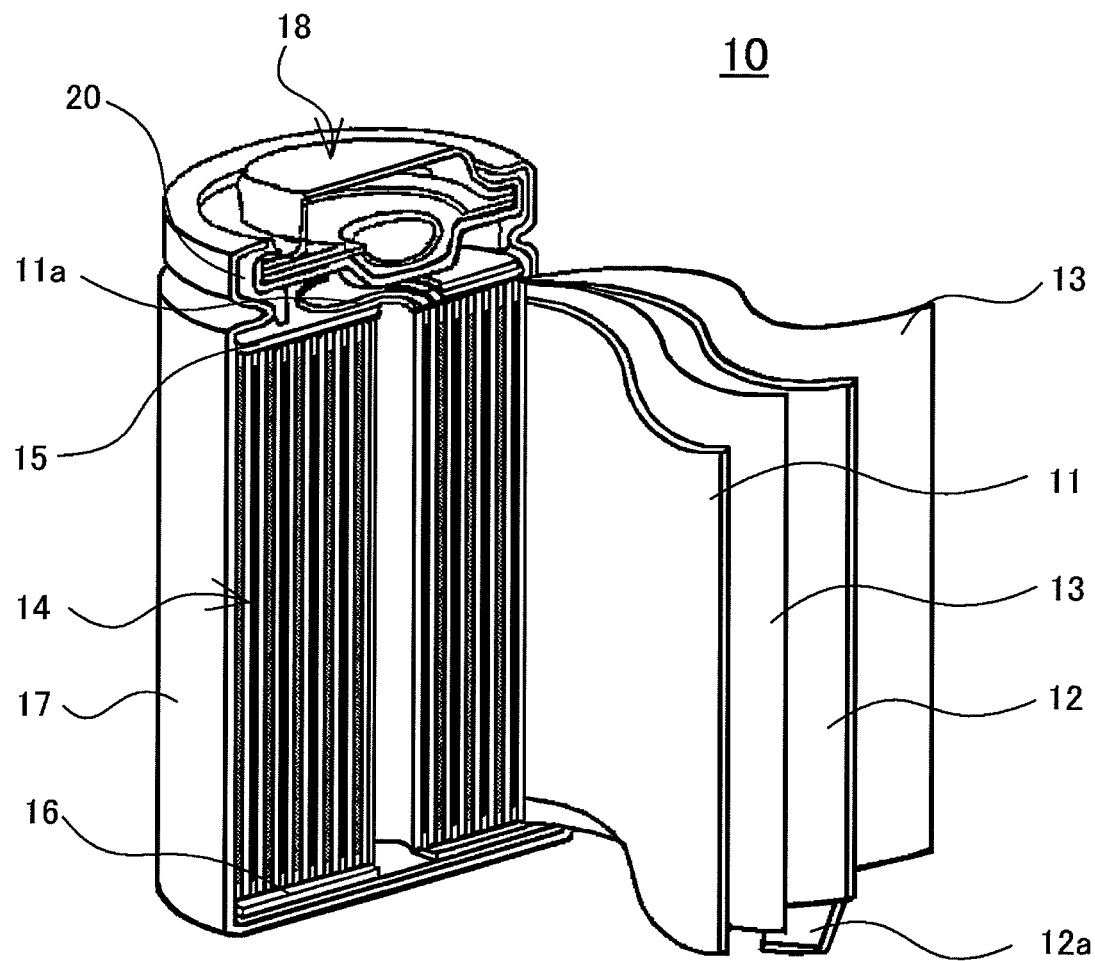
FIG. 1 is a perspective view showing a longitudinal section of a cylindrical-shaped nonaqueous electrolyte secondary battery common to Example and Comparative Examples.

First, the structure of a cylindrical-shaped nonaqueous electrolyte secondary battery will be explained with reference to FIG. 1 as the nonaqueous electrolyte secondary battery common to Example and each Comparative Example. FIG. 1 is a perspective view showing a longitudinal section of the cylindrical-shaped nonaqueous electrolyte secondary battery common to Example and Comparative Examples.

A cylindrical-shaped nonaqueous electrolyte secondary battery 10 used a rolled electrode assembly 14 formed by spirally rolling a positive electrode plate 11 and a negative electrode plate 12 interposing a separator 13 therebetween. The rolled electrode assembly 14 had insulating plates 15 and 16 on its upper and lower faces, respectively, and the whole was put into a cylindrical-shaped battery outer can 17 with a bottom also serving as a negative electrode terminal. The battery outer can 17 to be used was, for example, an iron can with its surface nickel-plated.

Then, a current collecting tab 12a of the negative electrode plate 12 was welded on an inner bottom part of the battery outer can 17, and a current collecting tab 11a of the positive electrode plate 11 was welded on a bottom plate part of a positive electrode terminal 18 also serving as a safety valve through a hole formed on the insulating plate 15. Then, a nonaqueous electrolyte, which is not shown in the drawings, was poured into the battery outer can 17, and a mouth portion of the battery outer can 17 was sealed through a gasket 20 with the positive electrode terminal 18 also serving as a safety valve.

Next, a specific method for manufacturing the nonaqueous electrolyte secondary battery common to Example and each Comparative Example, and a method for measuring various characteristics will be explained.

Manufacture of Positive Electrode

Lithium cobalt oxide was manufactured in the following manner. As for staring materials, lithium carbonate ($Li_2CO_3$) was used as the lithium source, and tricobalt tetraoxide containing magnesium, aluminum and zirconium obtained by thermal decomposition of the coprecipitate of cobalt (Co), magnesium (Mg), aluminum (Al) and zirconium (Zr) was used as the cobalt source. A predetermined amount of each staring material was weighed and mixed, and then the mixture was burned at 850° C. for 24 hours under air atmosphere to obtain lithium cobalt oxide containing magnesium, aluminum and zirconium. This was pulverized with a mortar so as to have an average particle diameter of 14 μm to give a positive electrode active material A.

Layered lithium nickel manganese oxide was manufactured in the following manner. As for staring materials, lithium carbonate ($Li_2CO_3$) was used as the lithium source, and a coprecipitated hydroxide represented by $Ni_{0.33}Mn_{0.33}Co_{0.34}(OH)_2$ was used as the transition-metal source. A predetermined amount of each staring material was weighed and mixed, and then the mixture was burned at 1000° C. for 20 hours under air atmosphere to obtain layered lithium nickel manganese oxide containing cobalt represented by $LiNi_{0.33}Co_{0.33}Mn_{0.34}O_2$. This was pulverized with a mortar so as to have an average particle diameter of 5 μm to give a positive electrode active material B.

The positive electrode active material A and positive electrode active material B obtained as above were mixed so as to have a mass ratio of 9:1. Next, the mixed positive electrode active material and acetylene black and polyvinylidene fluoride (PVdF) powders as the positive electrode conductive materials were poured into N-methyl-2-pyrrolidone (NMP) in a mass ratio of positive electrode active material:acetylene black:PVdF=94:3:3 and the whole was kneaded to prepare slurry of the positive electrode active material mixture. The slurry was applied on both sides of a positive electrode substrate made of aluminum foil having a thickness of 15 μm by a doctor blade method and then dried to form positive electrode active material mixture layers on both sides of the positive electrode substrate. Then, the positive electrode substrate was compressed with a compression roller, and cut out into a strip shape having a predetermined width to manufacture a positive electrode plate. The positive electrode plate was commonly used in Example and Comparative Examples 1 to 5.

Manufacture of Negative Electrode

Graphite powder as the negative electrode active material and styrene-butadiene rubber (SBR) (styrene:butadiene=1:1) was dispersed in water, and carboxymethyl cellulose (CMC) as a thickener was further added to prepare negative electrode active material mixture slurry. Here, the negative electrode active material mixture slurry was prepared so as to have a dry mass ratio of graphite:SBR:CMC=95:3:2. The negative electrode active material mixture slurry was applied on both sides of a negative electrode substrate made of copper foil having a thickness of 10 μm (Example and Comparative Examples 1, 2, 4 and 5) or 12 μm (Comparative Example 3) by a doctor blade method, and then dried to form negative electrode active material mixture layers on both sides of the negative electrode substrate. Then, the negative electrode substrate was compressed with a compression roller, and cut out into a strip shape having a predetermined width to manufacture a negative electrode plate.

Preparation of Nonaqueous Electrolyte

As for a nonaqueous electrolyte, the solution obtained as follow was used. In a mixed solvent of ethylene carbonate (EC), propylene carbonate (PC) and methyl ethyl carbonate (MEC) having a ratio of 10:30:60 (volume ratio, 25° C.), $LiPF_6$ was dissolved so as to be 1 mol/liter. PC is known to be a readily degradable organic solvent when charging at high voltage, but is a specifically adopted component in order to clearly ascertain the effect of the invention.

Manufacture of Rolled Electrode Assembly

With respect to the positive electrode plate manufactured in this manner, an exposed portion of the positive electrode substrate was formed at a central part in its longitudinal direction, and to the exposed portion of the positive electrode substrate, a positive electrode tab and protective insulating tape were attached. In addition, with respect to the negative electrode plate, an exposed portion of the negative electrode substrate where the negative electrode active material was not applied was formed on its roll end side, and to the exposed portion of the negative electrode substrate, a negative electrode tab and protective insulating tape were attached. Here, with respect to both of the positive electrode plate and negative electrode plate, as specifically described below with drawings, the roll end suitably had a region where the positive electrode active material mixture layer or negative electrode active material mixture layer was not formed according to each of Example and Comparative Examples 1 to 5.

Then, as shown in FIG. 1, the separator 13 made of polyethylene microporous membrane was interposed between the positive electrode plate 11 and negative electrode plate 12 to insulate each other. Subsequently, the whole was rolled and the outermost periphery of the exposed portion of the negative electrode substrate was adhered with an adhesive tape for fixing a roll end (not shown) to manufacture the rolled electrode assembly 14 to be used in each of Example and Comparative Examples 1 to 5. The rolled electrode assembly 14 was inserted into the cylindrical-shaped battery outer can 17, then an electrolyte was poured, and a mouth portion of the battery outer can 17 was sealed up with the positive electrode terminal 18 also serving as a safety valve to manufacture a cylindrical-shaped nonaqueous electrolyte secondary battery having a diameter of 18 mm, height of 65 mm and design capacity of 2800 mAh common to Example and each Comparative Example.

COMPARATIVE EXAMPLE 1

Figure 2:
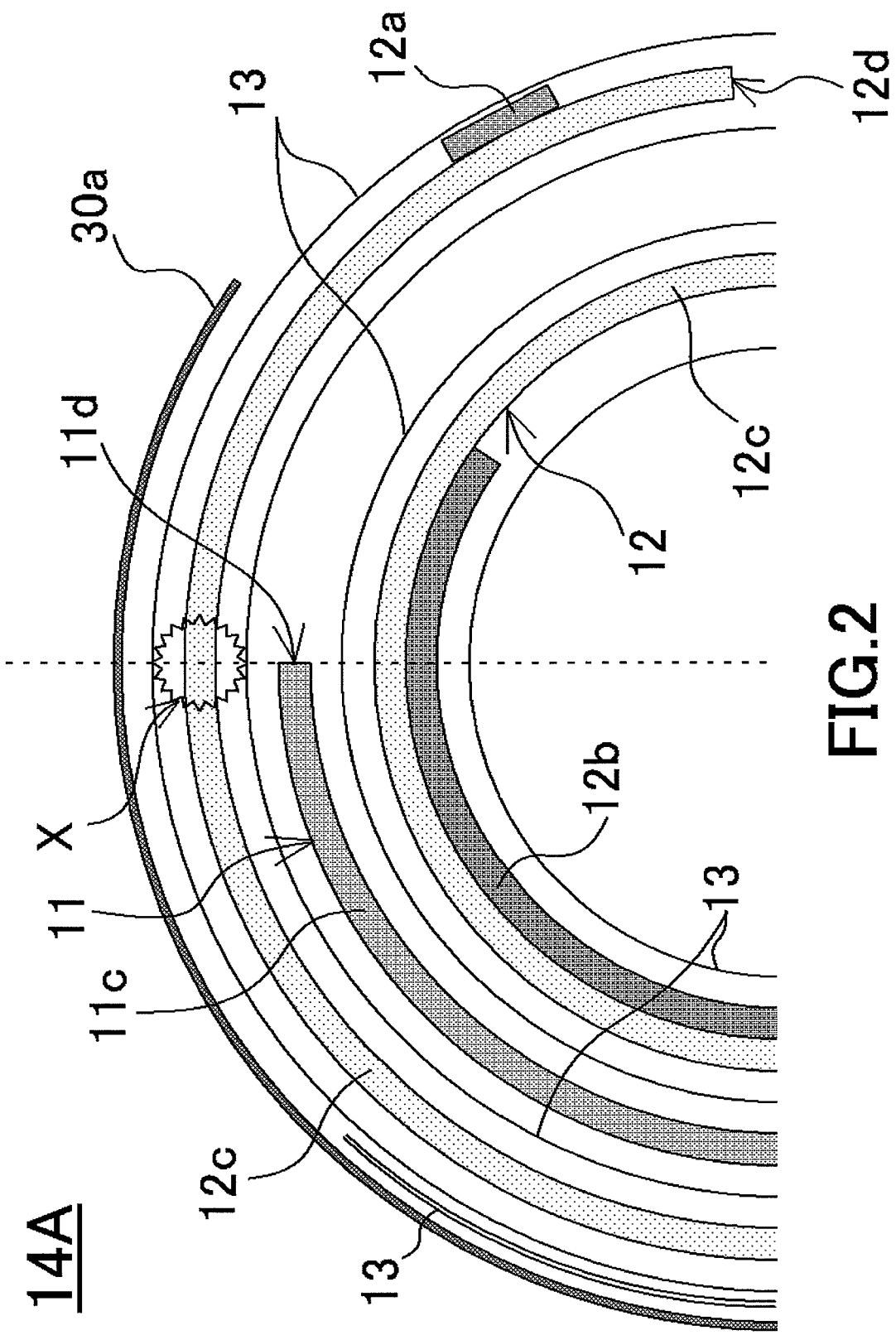
FIG. 2 is a schematic sectional view of a roll end of a rolled electrode assembly in Comparative Example 1.

The structure of the roll end of the rolled electrode assembly of Comparative Example 1 is shown in FIG. 2. In a rolled electrode assembly 14A of Comparative Example 1, a roll end 12d side of the negative electrode plate 12 had the exposed portion of a negative electrode substrate 12c where a negative electrode active material mixture layer 12b was not applied, and the exposed portion of the negative electrode substrate 12c extended over a roll end 11d of the exposed portion of a positive electrode substrate 11c. Then, an adhesive tape for fixing a roll end 30a was adhered to be overlapped with the roll end 11d of the exposed portion of the positive electrode substrate 11c so as to prevent loosening of the separator 13 on the outermost periphery.

COMPARATIVE EXAMPLE 2

Figure 3:
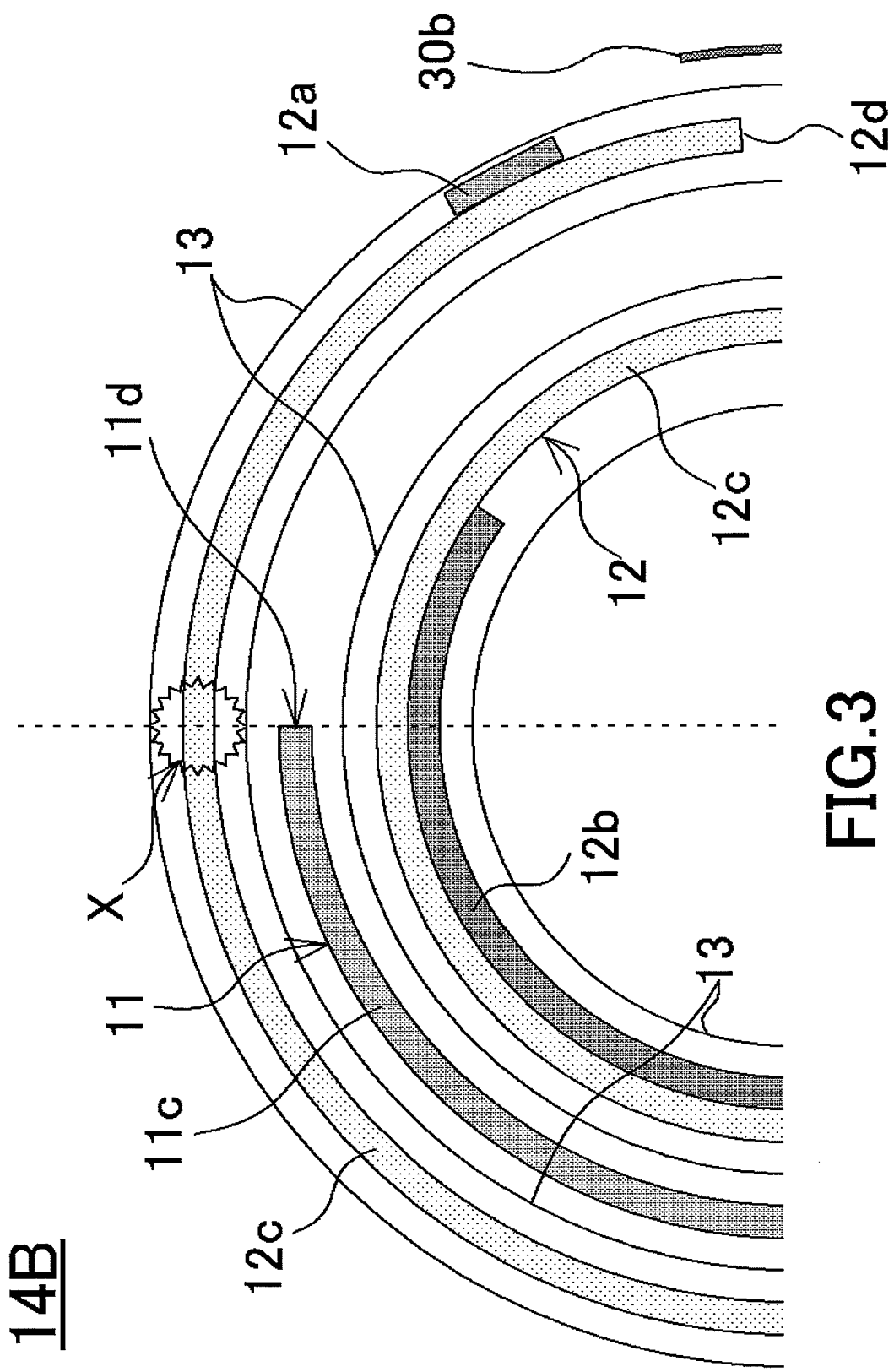
FIG. 3 is a schematic sectional view of a roll end of a rolled electrode assembly in Comparative Example 2.

The structure of the roll end of the rolled electrode assembly of Comparative Example 2 is shown in FIG. 3. In a rolled electrode assembly 14B of Comparative Example 2, the roll end 12d side of the negative electrode plate 12 had the exposed portion of the negative electrode substrate 12c where the negative electrode active material mixture layer 12b was not applied, and the exposed portion of the negative electrode substrate 12c extended over the roll end 11d of the exposed portion of the positive electrode substrate 11c. Then, an adhesive tape for fixing a roll end 30b was adhered to be overlapped with the roll end 12d of the exposed portion of the negative electrode substrate 12c so as to prevent loosening of the separator 13 on the outermost periphery.

COMPARATIVE EXAMPLE 3

The structure of the roll end of the rolled electrode assembly of Comparative Example 3 was the same as that of the roll end of the rolled electrode assembly 14A of Comparative Example 1 except that the negative electrode substrate had a thickness of 12 μm, and thus, the specific description is omitted.

COMPARATIVE EXAMPLE 4

Figure 4:
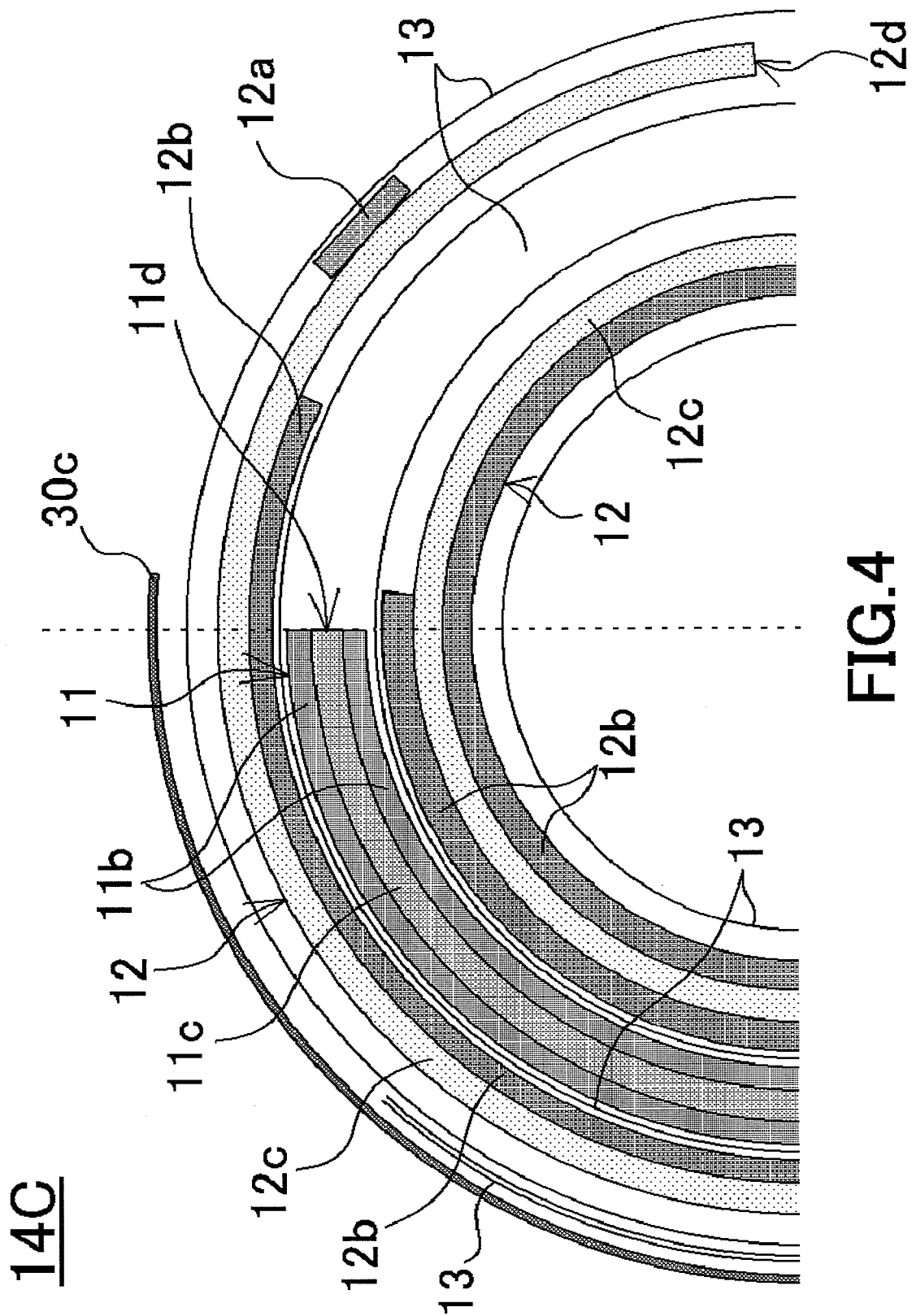
FIG. 4 is a schematic sectional view of a roll end of a rolled electrode assembly in Comparative Example 4.

The structure of the roll end of the rolled electrode assembly of Comparative Example 4 is shown in FIG. 4. In a rolled electrode assembly 14C of Comparative Example 4, the negative electrode active material mixture layer 12b was applied almost up to the roll end 12d of the negative electrode plate 12, and only the roll end 12d part had the exposed portion of the negative electrode substrate 12c where the negative electrode active material mixture layer 12b was not applied. Then, the negative electrode substrate 12c coated with the negative electrode active material mixture layer 12b extended over the roll end 11d of the positive electrode plate 11 where the positive electrode active material mixture layer 11b was formed on both sides of the positive electrode substrate 11c. Then, an adhesive tape for fixing a roll end 30c was adhered to be overlapped with the roll end 11d of the positive electrode plate 11 so as to prevent loosening of the separator 13 on the outermost periphery.

COMPARATIVE EXAMPLE 5

Figure 5:
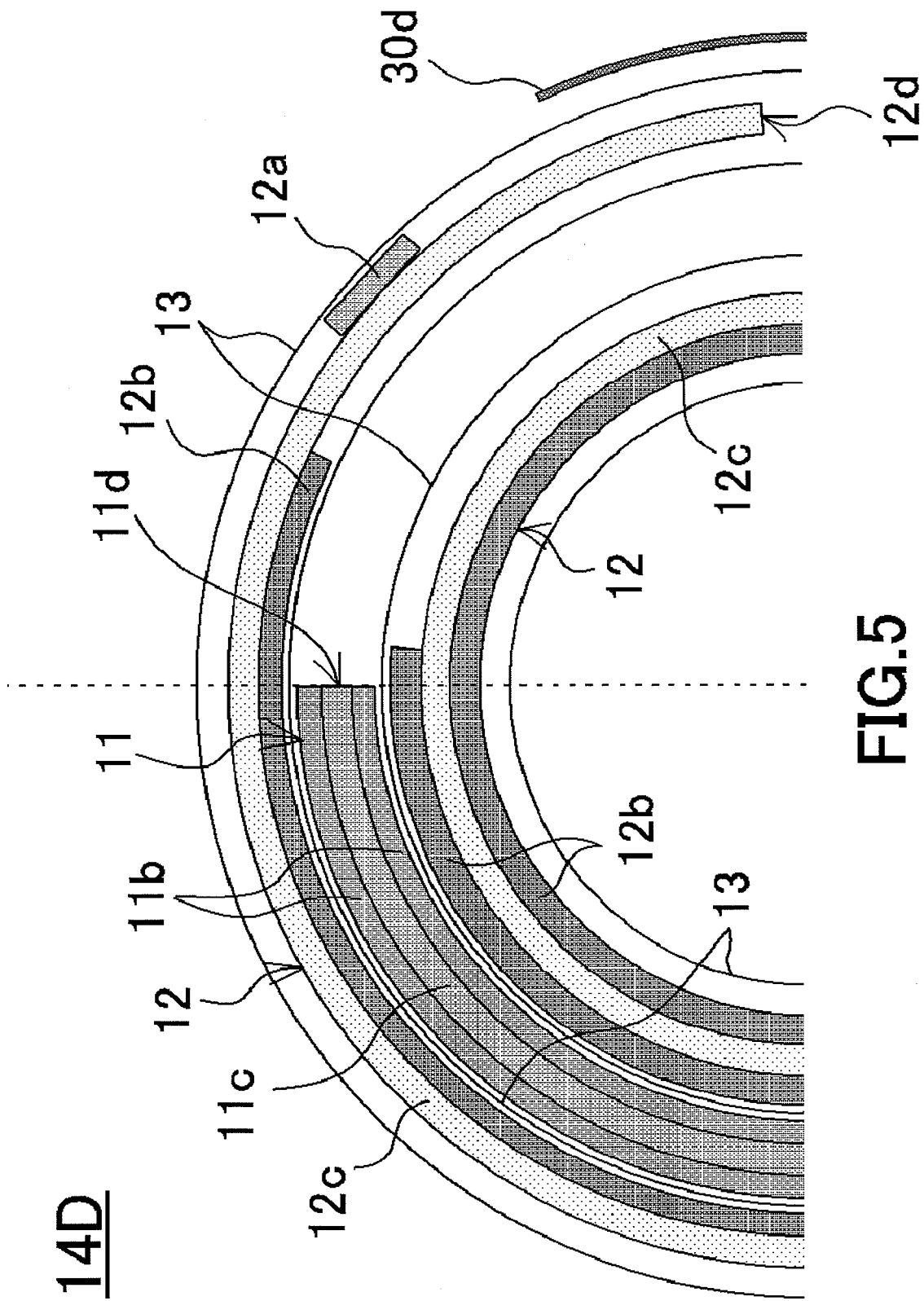
FIG. 5 is a schematic sectional view of a roll end of a rolled electrode assembly in Comparative Example 5.

The structure of the roll end of the rolled electrode assembly of Comparative Example 5 is shown in FIG. 5. In a rolled electrode assembly 14D of Comparative Example 5, the negative electrode active material mixture layer 12b was applied almost up to the roll end 12d of the negative electrode plate 12, and only the roll end 12d part had the exposed portion of the negative electrode substrate 12c where the negative electrode active material mixture layer 12b was not applied. Then, the negative electrode substrate 12c coated with the negative electrode active material mixture layer 12b extended over the roll end 11d of the positive electrode plate 11 where the positive electrode active material mixture layer 11b was formed on both sides of the positive electrode substrate 11c. Then, an adhesive tape for fixing a roll end 30d was adhered to be overlapped with the roll end 12d of the negative electrode plate 12 so as to prevent loosening of the separator 13 on the outermost periphery.

EXAMPLE

Figure 6:
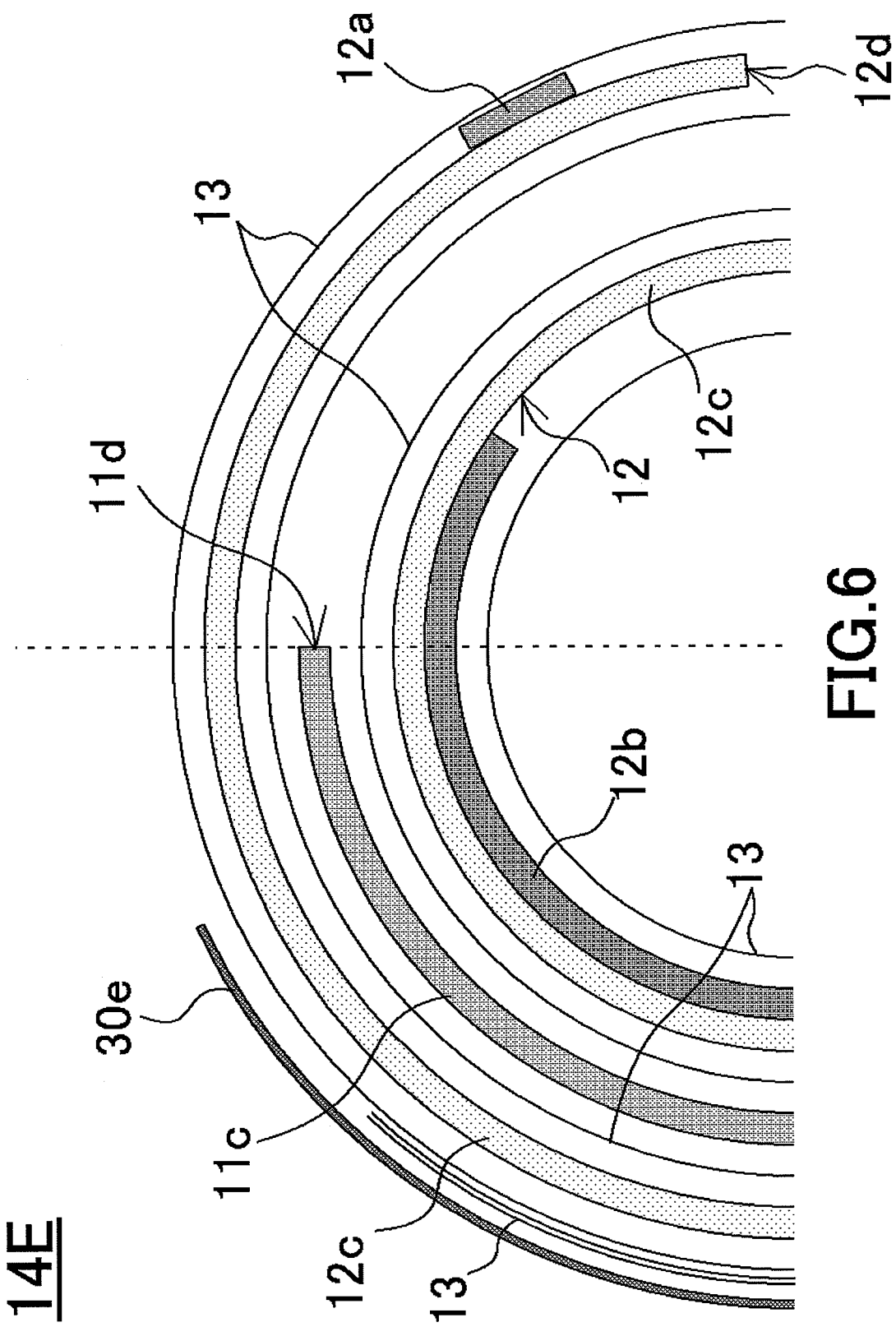
FIG. 6 is a schematic sectional view of a roll end of a rolled electrode assembly in Example.

The structure of the roll end of the rolled electrode assembly of Example is shown in FIG. 6. In a rolled electrode assembly 14E of Example, the roll end 12d side of the negative electrode plate 12 had the exposed portion of the negative electrode substrate 12c where the negative electrode active material mixture layer 12b was not applied, and the exposed portion of the negative electrode substrate 12c extended over the roll end 11d of the exposed portion of the positive electrode substrate 11c. Then, so as to prevent loosening of the separator 13 on the outermost periphery, an adhesive tape for fixing a roll end 30e was adhered on the roll end side of the separator 13 so as not to cover the roll end 11d of the exposed portion of the positive electrode substrate 11c as well as not to be overlapped with the roll end of the negative electrode substrate 12c.

Charge and Discharge Test-1

Each of the nonaqueous electrolyte secondary batteries of Example and Comparative Examples 1 to 5 was charged at 25° C. and at a constant current of 1 It=2800 mA until the battery voltage reached 4.20 V, and then charged at a constant voltage of 4.20 V until the current reached 1/50 It=56 mA to be a full charged state. The positive electrode potential at this time was 4.3 V vs. Li because the potential of the carbon material of the negative electrode active material was 0.1 V vs. Li. Then, the battery was discharged at a constant current of 1 It until the battery voltage reached 2.75 V, and this operation was regarded as one cycle of charging and discharging. The cycle was repeated 100 times, and then the battery was dismantled to be visually checked whether the positive electrode plate or negative electrode plate was broken. The concluded results are shown in Table 1.

Charge and Discharge Test-2

Each of the nonaqueous electrolyte secondary batteries of Example and Comparative Examples 1 to 5 was charged at 25° C. and at a constant current of 1 It=2800 mA until the battery voltage reached 4.35 V, and then charged at a constant voltage of 4.35 V until the current reached 1/50 It=56 mA to be a full charged state. The positive electrode potential at this time was 4.45 V vs. Li. Then, the battery was discharged at a constant current of 1 It until the battery voltage reached 3.00 V, and this operation was regarded as one cycle of charging and discharging. The cycle was repeated 100 times, and then the battery was dismantled to be visually checked whether the positive electrode plate or negative electrode plate was broken. The concluded results are shown in Table 1.

12 in both batteries of Comparative Example 1 and Comparative Example 2 were not broken. In contrast, in the charge and discharge test at 4.45 V vs. Li, the negative electrode plates 12 were broken at the position shown by a reference character X in FIGS. 1 and 2 in both batteries.

In Comparative Example 3 in which the negative electrode substrate had a thickness of 12 μm thicker than that in Comparative Example 1, the negative electrode plate 12 was not broken in the charge and discharge test at 4.45 V vs. Li. This shows that, when the thickness of the negative electrode substrate 12c is made to be thicker, the strength of the negative electrode substrate 12c becomes higher, so that the negative electrode plate 12 is hardly broken even when charging and discharging are carried out at high voltage. However, the thicker the thickness of the negative electrode substrate 12c is, the further the battery capacity deteriorates, so that the adoption is difficult without modification.

Furthermore, in Comparative Examples 4 and 5, each negative electrode substrate 12c on the outermost periphery side was coated with the negative electrode active material mixture layer 12b, and the adhesive tapes for fixing a roll end 30c and 30d were adhered to be overlapped with above the roll end 11d of the positive electrode plate 11 where the positive electrode active material mixture layer 11b was applied on both sides of the positive electrode substrate 11c (Comparative Example 4) or above the roll end 12d of the negative electrode substrate 12c (Comparative Example 5), respectively. Even in the charge and discharge test at 4.45 V vs. Li, each negative electrode plate was not broken. This shows that, because the negative electrode substrate on the outermost periphery side was coated with the active material mixture, in the same manner as when the thickness of the negative electrode substrate was made to be thicker, the apparent strength of the negative electrode substrate became higher, so that the negative electrode plate was hardly broken even when charging and discharging were carried out at high voltage.

In contrast, in Example, the outermost periphery side was the exposed portion of the negative electrode substrate 12c,

TABLE 1

| | Thickness of Negative Electrode Substrate (μm) | Negative Electrode on Outermost Periphery | Roll End Position of Adhesive Tape | 4.3 V* 100 Cycles | 4.45 V* 100 Cycles |
|---|---|---|---|---|---|
| Comparative Example 1 | 10 | Substrate Only | Above Roll End of Positive Electrode | Not Broken | Broken |
| Comparative Example 2 | 10 | Substrate Only | Above Roll End of Negative Electrode | Not Broken | Broken |
| Comparative Example 3 | 12 | Substrate Only | Above Roll End of Positive Electrode | — | Not Broken |
| Comparative Example 4 | 10 | With Coating | Above Roll End of Positive Electrode | — | Not Broken |
| Comparative Example 5 | 10 | With Coating | Above Roll End of Negative Electrode | — | Not Broken |
| Example | 10 | Substrate Only | No Overlapping | Not Broken | Not Broken |

*vs. Li/Li⁺

The results shown in Table 1 revealed the following. In Comparative Examples 1 and 2, each outermost periphery side was the exposed portion of the negative electrode substrate 12c, and the adhesive tapes for fixing a roll end 30a and 30b were adhered to be overlapped with above the roll end 11d of the positive electrode substrate (Comparative Example 1) and above the roll end 12d of the negative electrode substrate (Comparative Example 2), respectively. In the charge and discharge test at 4.3 V vs. Li, the negative electrode plates and the adhesive tape for fixing a roll end 30e was overlapped with neither the roll end 11d side of the positive electrode substrate 11c nor the roll end 12d side of the negative electrode substrate 12c. In the battery having such structure, the negative electrode plate was not broken in the charge and discharge test at 4.3 V vs. Li as well as in the charge and discharge test at 4.45 V vs. Li. Thus, it is clear that the nonaqueous electrolyte secondary battery of Example can effectively inhibit to break the negative electrode plate 12, in particular, even when the outermost periphery side of the rolled electrode assembly is only the negative electrode substrate.

What is claimed is:

1. A nonaqueous electrolyte secondary battery comprising:
a cylindrical shaped battery outer can; and
a rolled electrode assembly formed by rolling a positive electrode plate and a negative electrode plate with a separator interposed therebetween to insulate each other,
the positive electrode plate including a positive electrode substrate in which both sides of the positive electrode substrate is coated with a positive electrode active material mixture,
the negative electrode plate including a negative electrode substrate in which both sides of the negative electrode substrate is coated with a negative electrode active material mixture,
the rolled electrode assembly being put into the battery outer can, the separator being placed on an outermost periphery of the rolled electrode assembly,
the separator being fixed on the outermost periphery of the rolled electrode assembly with an adhesive tape for fixing a roll end,
an exposed portion of the negative electrode substrate without a negative electrode active material mixture layer being placed on an outermost periphery side of the negative electrode plate, a negative electrode tab being connected to the negative electrode substrate on the outermost periphery side, and
the adhesive tape for fixing a roll end of the separator does not extend beyond and cover the roll end point of the positive electrode substrate and a roll end point of the negative electrode substrate.

2. The nonaqueous electrolyte secondary battery according to claim 1, wherein the negative electrode substrate is made of copper foil, and a thickness of the negative electrode substrate is 10 μm or less and 6 μm or more.

3. The nonaqueous electrolyte secondary battery according to claim 1, wherein the positive electrode plate has a final charge voltage of 4.4 V or higher vs. Li.

4. The nonaqueous electrolyte secondary battery according to claim 2, wherein the positive electrode plate has a final charge voltage of 4.4 V or higher vs. Li.

5. The nonaqueous electrolyte secondary battery according to claim 1, wherein the negative electrode substrate includes an outermost roll being placed inside the separator which is placed on the outermost periphery of the rolled electrode assembly.

* * * * *